US008423895B2

United States Patent
Friedman et al.

(10) Patent No.: US 8,423,895 B2
(45) Date of Patent: Apr. 16, 2013

(54) METHOD AND APPARATUS FOR MULTI-FILE CONTROLS

(75) Inventors: Gil Friedman, Bney Atarot (IL); Guy Soffer, Raanana (IL)

(73) Assignee: SAP AG, Walldorf (DE)

(*) Notice: Subject to any disclaimer, the term of this patent is extended or adjusted under 35 U.S.C. 154(b) by 621 days.

(21) Appl. No.: 11/678,629

(22) Filed: Feb. 26, 2007

(65) Prior Publication Data

US 2008/0208894 A1   Aug. 28, 2008

(51) Int. Cl.
*G06F 3/00* (2006.01)
(52) U.S. Cl.
USPC ........................................................ 715/762
(58) Field of Classification Search .................. 715/762, 715/744, 826, 825
See application file for complete search history.

(56) References Cited

U.S. PATENT DOCUMENTS

| | | | |
|---|---|---|---|
| 7,185,317 B2* | 2/2007 | Fish et al. ..................... | 717/121 |
| 7,278,110 B1* | 10/2007 | Wugofski ..................... | 715/765 |
| 7,346,848 B1* | 3/2008 | Ruthfield et al. ............. | 715/749 |
| 7,490,298 B2* | 2/2009 | Bauman et al. ............... | 715/788 |
| 7,499,933 B1* | 3/2009 | Simpson ....................... | 707/101 |
| 7,840,614 B2* | 11/2010 | Owen et al. ................... | 707/821 |
| 2001/0037490 A1* | 11/2001 | Chiang .......................... | 717/2 |
| 2002/0063734 A1* | 5/2002 | Khalfay et al. ............... | 345/744 |
| 2002/0085033 A1* | 7/2002 | Robinson et al. ............. | 345/762 |
| 2004/0056894 A1* | 3/2004 | Zaika et al. ................... | 345/762 |
| 2004/0135808 A1* | 7/2004 | Sagara et al. ................. | 345/762 |
| 2006/0041879 A1* | 2/2006 | Bower et al. .................. | 717/162 |
| 2006/0085745 A1* | 4/2006 | Anderson et al. ............. | 715/530 |
| 2006/0090130 A1* | 4/2006 | Bent et al. ..................... | 715/530 |
| 2006/0184878 A1* | 8/2006 | Argo et al. .................... | 715/700 |
| 2006/0230379 A1* | 10/2006 | Pintos ........................... | 717/109 |
| 2006/0288301 A1* | 12/2006 | Hood et al. ................... | 715/762 |
| 2011/0145735 A1* | 6/2011 | Driesner et al. .............. | 715/762 |

* cited by examiner

*Primary Examiner* — Rashawn Tillery

(57) ABSTRACT

A method and apparatus for enabling a unit such as a complex control comprising multiple pages, which should be implemented as a single pair of user interface file and code file, to be implemented in a multiplicity of files, to enable multiple developers to work concurrently on the control, and to enable dynamic addition, deletion or update of pages in a control. The method comprises constructing a template describing the complex control, generating separate pages according to the template, and in run time aggregating the separate pages, renaming elements within the separate pages and routing events to the event handlers implemented by the separate pages.

15 Claims, 3 Drawing Sheets

METHOD AND APPARATUS FOR MULTI-FILE CONTROLS

BACKGROUND OF THE INVENTION

1. Field of the Invention

The present invention relates to constructing computerized controls in general, and to multi-file controls in particular

2. Discussion of the Related Art

Controls, sometimes referred to as virtual controls, are the building blocks of the Graphic User Interface (GUI) of computerized systems. Some controls are basic and enable a single action, such as checking a checkbox, entering text in a text box, selecting a radio button, or the like, while other are more complex and provide a variety of options, such as dialogs, wizards, or the like. Complex controls are typically constructed of further basic or complex controls. For example, an "Options" dialog opened from within almost any software, such as Microsoft WinWord, made by Microsoft of Redmond, Wash., USA, may comprise a multiplicity of pages, each page presenting options relevant to a specific topic. Typically, in such controls, there is no connection between different pages, and the options within each page are selected independently from the options in other pages. All pages belonging to a specific complex control possibly share one or more controls, such as an "OK" button, a "Cancel" button, a "Save" button or the like.

The construction of each control comprises designing the user interface, as well as writing or otherwise generating code that performs the required actions when the control is used. In multiple development environments, such as Microsoft ASP-.NET, Microsoft Windows Presentation Framework (WPF), Microsoft DuetML, all manufactured by Microsoft of Redmond, Wash. USA, each control is comprised of user interface and code, wherein the user interface is comprised in a single unit, and the code is also limited to being contained within a single unit, typically a single file. This constraint poses a number of problems. First, if a control is limited to a single user interface file and a single code file, then designing the control and writing the code can not be parallelized. Thus, even if the control comprises unrelated pages, the development effort on the control whether by one developer or by multiple developers working on different pages, has to be done serially, and can not be done concurrently, thus lengthening the development times.

Another problem with the single-files limitation relates to using the control. If a control is associated with a single user interface file and a single code file, the whole code related to a control is compiled or otherwise processed as a monolithic unit, and is deployed and used as such. Thus, no changes can be made to a control without recompiling and redeployment. For example, a page can not be dynamically added to or removed from a control, rather the control has to be replaced. Further, in order to develop different versions of a control, the different versions associated for example with different roles in an organization, user interface and code files have to be duplicated and compiled separately, which complicates maintenance.

There is therefore a need in the art for a method and apparatus for enabling usage of multiple pairs of user interface and code units within a single control.

SUMMARY

It is an object of the present invention to provide a novel method and apparatus for enabling to implement the functionality of a unit such as a control, by a multiplicity of entity sets, instead of a single or another predetermined number of sets. The method and apparatus include generating a template for the unit, writing the entity sets, such as pairs of files according to the template, and in runtime aggregating the functionality and interface of the sets of entities into a single set of entities.

In an exemplary embodiment of the present invention a method for implementing a unit providing functionality, using a multiplicity of sets of entities, each set of entities based on a template, and each set of entities implementing one or more tasks associated with the functionality, the method comprising: generating a framework for supplying the functionality, the framework comprising the steps of accessing the multiplicity of sets of entities and associating one or more events with a task implemented by a set of entities; and executing the framework to provide the functionality. The framework can further comprising a step of aggregating an entity from each of the multiplicity of sets of entities. The framework optionally comprises a step of renaming one or more elements comprised in an entity of one of the multiplicity of sets of entities. Accessing the multiplicity of sets of entities is optionally performed according to an at least one parameter. The parameter can be a language or a role associated with a user of the unit. Optionally, the multiplicity of sets of entities comprises a first set of entities and a second set of entities, wherein the first set of entities activates functionality embedded in the second set of entities. Within the method, one or more aspects associated with the template can be constructed according to the at least one set of entities, the aspects are optionally user interface or behavior. The template optionally comprises a description of an arrangement of the multiplicity of sets of entities within the unit, or a definition of an interface to be implemented by each of the multiplicity of sets of entities. One or more of the multiplicity of sets of entities comprises one or more files. The one or more files can describe user interface. The one or more files can include an XML file or a code file.

Another aspect relates to an apparatus for implementing a functionality-providing unit, providing functionality in a multiplicity of sets of entities, the apparatus comprising: a framework generation component for generating a framework performing the functionality, the framework comprising: an entity-accessing component for accessing multiplicity of sets of entities; and a routing generation component for associating one or more events with one or more tasks implemented by the multiplicity of sets of entities. The apparatus can further comprise entity generation component for generating one or more sets of entities in accordance with a template, the sets of entities implementing one or more tasks associated with the required functionality. Each of the multiplicity of sets of entities can comprise one or more files. The files can describe user interface. Optionally, the files are XML files or code files. The apparatus can further comprise a template generation component for generating one or more templates for the functionality-providing unit. The template generation component can comprise an arrangement description component for describing an arrangement of the multiplicity of sets of entities within the functionality-providing unit. The template generation component can comprise an interface definition component, for defining an interface to be implemented by each of the multiplicity of sets of entities. Within the apparatus, the framework generation component optionally comprises an aggregating component for aggregating an at least one entity from each of the multiplicity of sets of entities. The framework generation component can further comprise a renaming component for renaming one or more elements comprised in one or more entities from the multiplicity of sets of entities.

Yet another aspect relates to a computer readable storage medium containing a set of instructions for a general purpose computer, the set of instructions comprising: generating a framework for performing functionality using a multiplicity of sets of entities, each of the multiplicity of sets of entities based on a template, each of the multiplicity of sets of entities implementing one or more tasks associated with the functionality, the framework performing the steps of: accessing the multiplicity of sets of entities and associating one or more events with one or more tasks implemented by at least one of the multiplicity of sets of entities; and executing the framework to provide the functionality.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION

Figure 1:
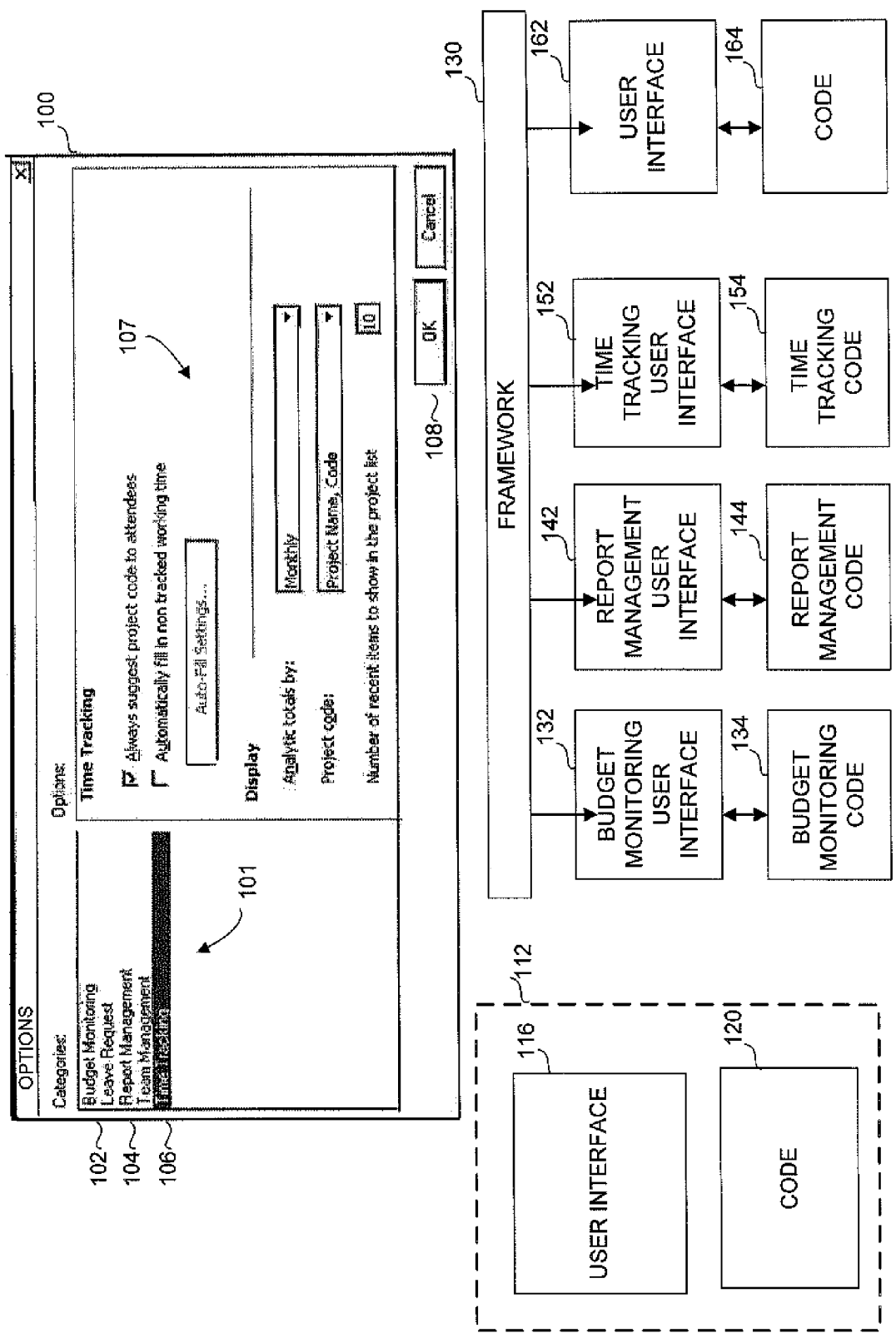
FIG. 1 is a schematic illustration of the differences between a traditional system and the disclosed invention.

Provided is a novel solution which enables a unit such as a control, the functionality of which is constrained to be implemented in a single set of entities, to be implemented by a multiplicity of entity sets, each set comprising for example user interface and a code file. The multiplicity of sets enables concurrent rather then serial or independent development of the control. The sets are gathered dynamically, and are not packed into a single set, thus enabling to adapt controls to changing circumstances such as a language, a role associated with each user of the control. The adaptation of the control can thus include updating, adding or deletion of pages related to the control, or the like.

A framework component is used for activating in runtime a complex control, the user interface and code of which are dispersed over a multiplicity of user interface and code files. A complex control can be for example a dialog having multiple pages which can be selected by the user by clicking on one or a multiplicity of tabs, an item in a list, an item in a drop down list, or the like.

Each complex control is of a specific template, the template defining the general arrangement of the separate components and related characteristics, such as file types. The template comprises an interface, i.e. one or more procedures, methods or functions which the implementer of every separate control must implement. The separate components of the complex control are developed according to the template, and each of separate control implements the interface. At run time, a framework object is generated according to the template, the framework object accessing all separate control definitions relevant to the complex control, for example according to the file types, and enabling a user to use all separate controls. The framework preferably generates a single user interface file comprising the user interfaces of the separate components, for example by nesting a multiplicity of XML files into a single XML file. The framework is further responsible for renaming all variable and all called methods to ensure name uniqueness, and for routing the user's actions to methods of the separate controls according to the displayed separate control. The framework user interface file and routing the commands handled by the separate controls imitate the role of the single user interface file and single code file associated with traditional systems.

The disclosed apparatus is typically developed on one or more computing platforms such as a personal computer, a mainframe computer, or any other type of computing platform that is provisioned with a memory device, a CPU or microprocessor device, and several I/O ports. Each device optionally comprises a storage device. Alternatively, each device can be implemented on firmware ported for a specific processor such as digital signal processor (DSP) or microcontrollers, or as hardware or configurable hardware such as field programmable gate array (FPGA) or application specific integrated circuit (ASIC). The invention can be developed on multiple computing platforms, preferably interconnected via a communication channel such as a local area network (LAN), a wide area network (WAN), the Internet or the like. The invention is also used on one or more computing platforms as detailed above. In one preferred embodiment, the apparatus can be used on a standalone computer, wherein all components of the implemented apparatus are stored on the user's computing platform. In another preferred embodiment, some components of the disclosed invention are stored on one or more other computing platforms, which are in communication with the user's computing platform.

The disclosed apparatus is preferably implemented as three sets of executables running on said computing platforms. One set of executables relates to generating a template, the other set relates to defining pages, and the third set relates to using the invention. Each set of executables is comprised of one or more units containing instructions, such as static libraries, dynamic link libraries, or the like. The instructions can be programmed in any programming language, such as C, C#, C++, Java, VB, VB.Net or the like, and be developed under any development environment, such as J2EE, .Net, or the like. The apparatus of the disclosed invention may include various computer readable media having suitable software thereon, for example, diskettes and computer and/or flash RAM.

Figure 2:
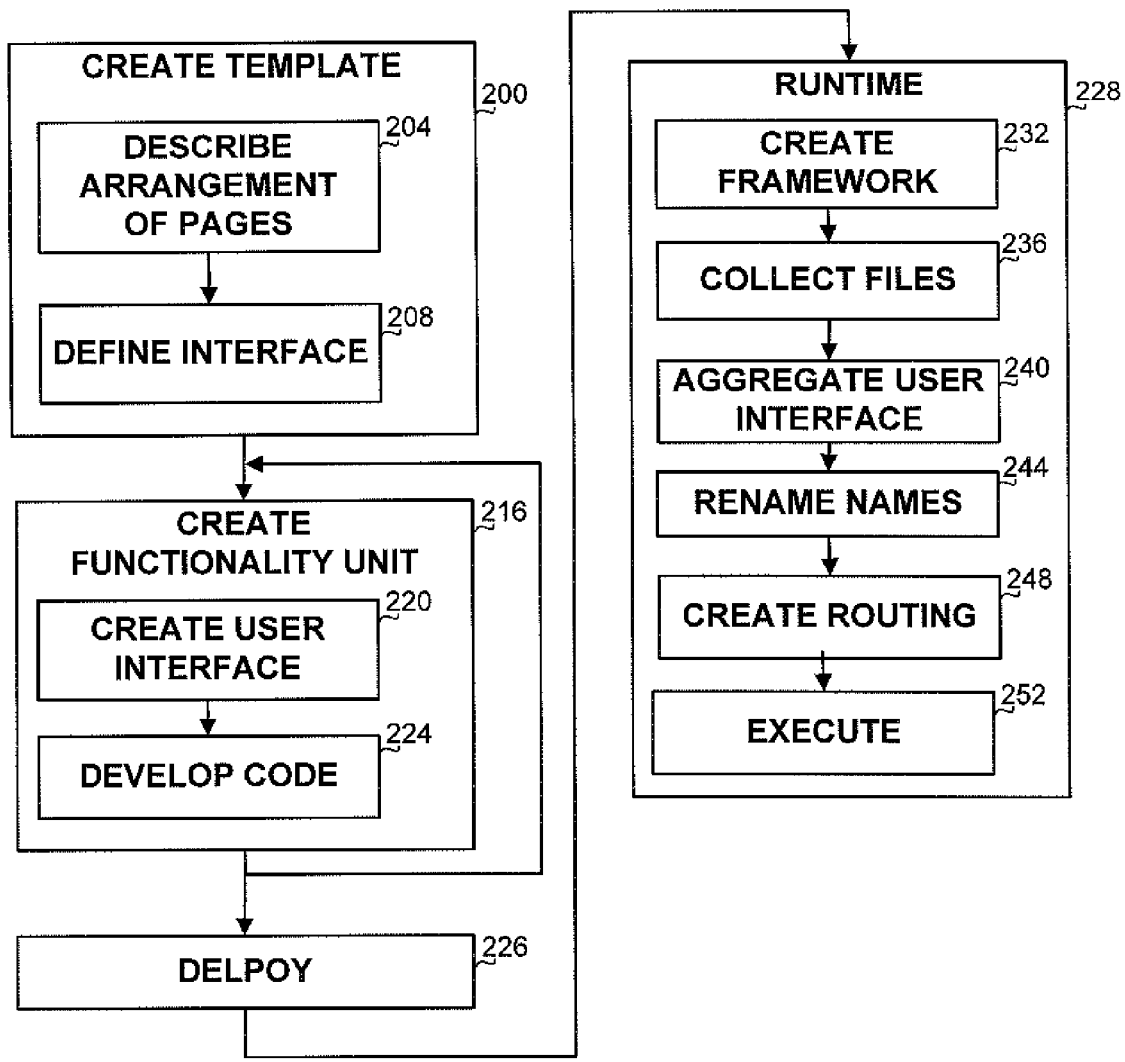
FIG. 2 is a flowchart of the main steps associated with the method of the disclosed invention.

Referring now to FIG. 1 which illustrates the differences between the traditional system comprising a single user interface and single code file, and the disclosed apparatus and method. FIG. 1 shows an options dialog, generally referenced 100. Dialog 100 has a number of possibly unrelated pages, acceded by clicking on the associated name of the page as appears in categories pane 101, such as budget Monitoring 102, Report Management 104 or Time Tracking 106. In FIG. 1, the user clicked, or otherwise pointed at Time Tracking 106, which caused the controls appearing on pane 107 to be displayed. In a traditional system, the user interface of the dialog and the code behind it are comprised within a single pair of files 112. Files 112 comprise a user interface file 116 containing all the controls appearing on pane 101, such as the pages names, all the controls appearing on pane 107 as shown, and all controls that can appear on pane 107 if any other line of pane 101 is selected. Files 112 further comprise a code file 120, comprising all code that is associated with the controls, including the controls appearing on pane 101, and all controls that appear or that can appear on pane 106 when any of the lines on pane 101 are clicked. In the disclosed apparatus, a separate pair comprising a user interface file and a code file is generated for each page, such as budget monitoring user interface file 132 and budget monitoring code file 134 describe the user interface and functionality enabled when the user clicks on budget monitoring line 102, report management user interface file 142 and report management code file 144 describe the user interface and functionality enabled when the user clicks on report management line 104, and, time tracking user interface file 152 and time tracking code file 154 describe the user interface and functionality enabled when the user clicks on time tracking line 106. During runtime, a framework object 130 is generated, which combines in runtime the user interface files including budget monitoring user interface file 132, report management user interface file 142 and time tracking user interface file 152 into a single user interface file 162. The framework also generates a code file 164 which routes the events associated with the controls comprised on any of the pages into the relevant event handlers in any of budget monitoring code file 134, report management code file 144, and time tracking code file 154. Thus, one or more developers can develop pages appearing in the same complex control without depending on each other. Further, the pages are aggregated at runtime into a single complex control, so pages can be updated, removed, or added in run time. The framework file is generated according to the template Referring now to FIG. 2, showing a flowchart of the main steps in a preferred embodiment of a disclosed method. At step 200 a developer generates a template for a unit, for example a complex control such as an "options" dialog, comprising multiple pages. The template preferably describes the structure of the unit. The developer optionally describes on step 204 the graphic arrangement of complex control and of the pages within the complex control, and how a user of the complex control moves between pages. The developer further defines the type of pages that will be presented as a part of the complex control, for example by a common suffix. The developer further defines on step 208 an interface which all pages have to implement. Such interface preferably comprises one or more methods which the code of the single page should implement, for example handling the events generated when a user of the control first shows the page, clicks on "OK", "cancel", leaves the page or other events that may occur for any of the pages. Once such template is prepared, it can be used for multiple complex controls. For example, a company having multiple products can use the same template designed for an "options" dialog to let the user select options in all its products. The option pages relevant to each dialog vary according to the product, but the general structure is the same, which may provide the company with a uniform look-and-feel for its products.

Once the template is ready, functionality entities such as pages are generated on step 216, in accordance with the template. The generation of each page comprises generating a user interface on step 220, whether by a graphic tool which is translated to a descriptive file such as an XML file, or by directly editing the descriptive file. On step 224 the page developer writes the code for the page. The code implements one or more tasks associated with the control, such as one or more event handlers for the events that can be sent to the page, such as using any control of the page, updating fields, or the like. Code development step 224 further comprises implementing the interface defined by the template developer on step 208. The developed code is optionally compiled into an object file, comprising computer instructions. Functionality entity generation step 216 repeats for all pages required for a control. Since each page is developed independently, multiple pages can be developed concurrently by multiple developers, but a single developer can also develop multiple pages concurrently or serially. Further, even mutually exclusive pages, for example a page comprising options relevant only to a manager and a page comprising options relevant only to a worker can be developed concurrently. It will be appreciated that the disclosed method and apparatus can also be used for a single-page control.

On step 226 the product is deployed for the usage of an end user. Deployment comprises providing an end user the template generated on step 200 and the collection of pages generated on step 216 which are relevant for the specific user. The files associated with the template and the pages, i.e. the pairs of user interface files and code files are preferably stored in a configurable location on the user's computing platform, or on another computing platform to which the user's platform has access. Preferably, only pages relevant to the specific users are stored in such location, otherwise pages that should not be accessed by such user may be presented to him, which is undesirable.

On step 228, the user uses the complex control. The complex control can be used as part of an application, such as a multi-page "Options" dialog frequently enabled in applications. The complex dialog is first activated by the user, for example when the user selects the "options" item from a menu. On step 232 a framework is generated, according to the template generated on step 200. The framework is responsible for accessing from the configurable location all files indicating pages or other separate controls on step 236. In a preferred embodiment the pairs of files are accessed, wherein each pair comprised a user interface file and a code file. On step 240 the framework further aggregates the user interface files, such as the XML files into a single file, comprising the user interface of all relevant pages. When XML format or another hierarchical format is used, aggregating a multiplicity of control descriptions into a single file is done by generating a top-level hierarchy and nesting the individual descriptions into the hierarchy. On step 244, the framework renames the methods, functions, global variables or other externally accessible elements in all the code files generated on step 224. The renaming can be done on the object code generated on step 224, or on the source file if no compilation is required when using the specific development environment. The renaming can be performed, for example by preceding each name within the file with the file name, or with another unique identifier. The renaming assures uniqueness of each identifier, so no name ambiguity can occur. On step 248, the routing of events is defined. The routing is defined by associating each event that is sent to any control on a specific page with the relevant event handler written by the page developer, and renamed on step 244. On step 252 the complex control is activated by executing the framework, including presenting a list or another access option to the available pages, displaying the pages according to the user's actions, and routing the events generated by the operating system in response to the user's actions, to the associated and renamed event handlers. If the control is used as part of an application, and if the control is constant and does not have to be updated every time it is used, then steps 232-248 can be performed just once when the application is started, and not repeatedly every time the control is used.

Figure 3:
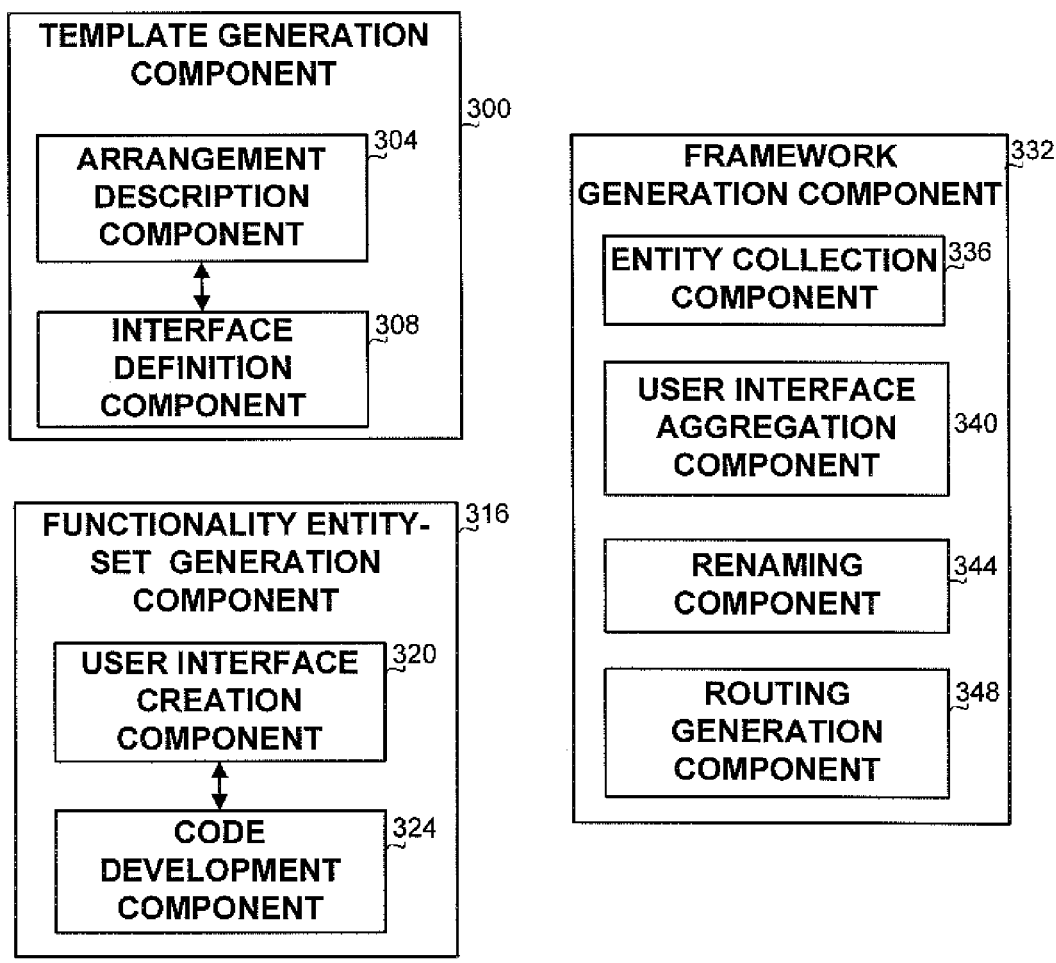
FIG. 3 is a block diagram of the main components in an apparatus according to the disclosed invention.

Referring now to FIG. 3, showing a block diagram of the main components in an embodiment of the disclosed apparatus. The apparatus comprises a template generation component 300, which comprises an arrangement description component 304 and an interface definition component 308. Arrangement description component 304 preferably comprises a graphic user interface for describing the arrangement of the separate pages and how to access them. Interface generation component provides the developer with tools to generate an interface, i.e. generate the definition of methods, rather than their implementation. Template generation component 300 is preferably generated or otherwise acquired once for each environment such as an organization, and used once for each type of complex control that has to be developed by the organization.

The apparatus further comprises a second part, functionality entity generation component 316, which is used for generating the set of entities, such as the pages of the complex control, after the relevant template has been developed by using template generation component 300. Functionality entity-set generation component 316 preferably comprises a user interface generation component 320 for defining the user interface of the separate page associated with the complex control. The user interface can be defined graphically or by directly editing a text file describing the user interface of the page, including the controls displayed on the page, such as text boxes, texts, menus, drop down menus, check boxes, radio buttons, or other controls. Functionality entity set generation component 316 optionally further comprises a code development component 324 for programming the event handlers associated with the controls on the developed page, and additional functionality, such as database query or updating. The developed code must also contain implementation of the methods included in the interface defined by interface definition component 308, comprising for example event handlers for "OK" or "Cancel" buttons. The second part of the apparatus is used by one or more page developers, working on one or more complex controls.

The third part of the apparatus comprises framework generation component 332. Framework generation component 332 is used by the computing platform of the end-user of the complex control. When the end user activates the complex control, the framework generation component is activated, which enables the function of the unit through the created template and pages. Framework generation component 332 comprises an entity-accessing component 336 which accesses the relevant entity sets such as the pairs of user interface and code. The pairs are optionally accessed from a designated directory, which may depend on the user name, the user's role or other parameters. Framework generation component 332 further comprises a user interface aggregation component 340, which preferably aggregates the separate user interface definitions for the separate pages, as appearing in the entity sets, into a unified file. Yet another component of framework generation component 332 is renaming component 344 which renames the methods, global variables and other elements appearing in the code files developed for each page, and routing generation component 348 which maps the events within the complex controls to the event handlers within the developed code filed. Once the aggregation and mapping are completed, the complex control is executed by the operating system as every control.

The disclosed method and apparatus eliminate a limitation that a control must comprise a single user interface file and a single code file. The disclosed method and apparatus enable the usage of multiple user interface descriptions and multiple code files within a single control, preferably a multi-page control. The provided mechanism thus enables distributed work on separate pages of a control, so that multiple developers can work concurrently on the same control, thus speeding its completion and enables the developing organization to meet more aggressive deadlines. Another advantage of separating user interface and code into multiple files is the enablement to construct complex controls online, without prior information about the available pages. The online construction enables dynamic addition, deletion, or updating of one or more pages without affecting other pages, and further enables the adaptation of the relevant pages to each user.

It will be appreciated by a person skilled in the art that the disclosed method can be used in other situations in which there is need to implement functionality constrained to be implemented by a single set of entities, in multiple sets of entities. The entities can be user interface files, code files, resources or the like. Eliminating such limitation enables to distribute the development effort required for implementing a single set of entities such as files, by dividing the single set into multiple sets, thus enabling parallelization of the development effort. The renaming and routing caters for aggregating separate sets into a unified component in runtime, thus enabling a dynamic adaptation of the used system to the circumstances, such as the role of the user, a required language, or the like.

It will also be appreciated that using the disclosed methods and apparatus, it is possible for one page to send or receive messages or events or otherwise activate functionality associated with or embedded within another page. The cross-page communication can be performed, for example, by incorporating appropriate methods in the interface implemented by all pages. Such methods should include an indication for the page the message is intended for, and a message-type indication. Such method can be called from each page to activate a method of any other page. It will also be appreciated that it is possible to construct the template dynamically according to the aggregated pages. Constructing the template can relate to aspects such as the visual arrangement of the control using the template, or its behavior. For example, one of a multiplicity of templates can be used and enhanced according to a configuration stored for example in a file, in the registry or the like. The template's behavior can also be learned from the aggregated pages.

It will be further appreciated that the disclosed methods and apparatus are not limited to presenting the user interface in XML format, but any other format can be used as well.

The present methods and apparatus have been described using non-limiting detailed descriptions of embodiments thereof that are provided by way of example and are not intended to limit the scope of the methods and apparatus. It should be understood that features described with respect to one embodiment may be used with other embodiments and that not all embodiments of the methods and apparatus have all of the features shown in a particular figure or described with respect to one of the embodiments. It is noted that some of the above described embodiments may describe the best mode contemplated by the inventors and therefore include structure, acts or details of structures and acts that may not be essential to the methods and apparatus and which are described as examples.

The present methods and apparatus are not limited to what has been particularly shown and described hereinabove. Structure and acts described herein are replaceable by equivalents, which perform the same function, even if the structure or acts are different, as known in the art. The scope of the present method and apparatus is defined only by the claims which follow. When used in the following claims, the terms "comprise", "include", "have" and their conjugates mean "including but not limited to".

The invention claimed is:

1. A method for implementing a control that provides functionality to a user of an application executed by a computing platform, the control using a plurality of file sets, each of the plurality of file sets comprises a user interface file and a code file, each of the plurality of file sets implementing an at least one task associated with the functionality; the user interface file of each of the file sets describes a display of the file set; the code file of each of the file sets is specific to the file set, the method comprising:

aggregating in runtime the interface file only, from each of the plurality of file sets, into a unified user interface file, the unified user interface file describing the display of the control on a display device; and associating an at least one event with the at least one task implemented by a code file of one file set from the plurality of file sets; wherein the event comprises activating a display of the one file set from the display of the control; and wherein the associating is for executing the at least one task.

2. The method of claim 1 further comprises a step of renaming an at least one element comprised in a code file of one of the plurality of file sets for enabling the associating.

3. The method of claim 1 wherein the at least one parameter is selected from the group consisting of; a language; and a role associated with a user of the unit.

4. The method of claim 1 wherein the plurality of file sets comprises an at least one first file set and at least one second file set, and wherein the at least one first file set activates functionality embedded in the at least one second file set.

5. The method of claim 1 wherein the user interface of the file set comprises a description of an arrangement of the plurality of file sets within the unit.

6. The method of claim 1 wherein the at least one user interface file is an XML file, and wherein aggregating the user interface file from each of the plurality of file sets into a unified user interface file comprises generating a top-level hierarchy and nesting contents from the user interface file into the hierarchy.

7. A computer implemented apparatus for implementing a functionality for providing control to a user; the control using a plurality of file sets; each of the plurality of file sets comprises a user interface file and a code file; the user interface file of each of the file set describes a display of the file set, The code file of each of the file set is specific to the file set, the apparatus comprising:

an aggregation component for aggregating in runtime the user interface file only from each of the plurality of file sets into a unified user interface file, the unified user interface file describing the display of the control on a display device; and a routing generation component for associating an at least one event with an at least one task implemented by a code file of one file set from the plurality of file sets; wherein the event comprises activating the display of the file set from the display of the control and wherein the associating is for executing the at least one task.

8. The apparatus of claim 7 further comprising an entity generation component for generating an at least one file set in accordance with a template, the at least one file set implementing an at least one task associated with the required functionality.

9. The apparatus of claim 7 wherein the at least one user interface file is an XML file, and wherein aggregating the user interface file from each of the plurality of file sets into a unified user interface file comprises generating a top-level hierarchy and nesting contents from the user interface file into the hierarchy.

10. The apparatus of claim 7 further comprising a template generation component for generating an at least one template for the functionality-providing unit.

11. The apparatus of claim 10 wherein the template generation component comprises an arrangement description component for describing an arrangement of the plurality of file sets within the functionality-providing unit.

12. The apparatus of claim 10 wherein the template generation component comprises an interface definition component, for defining an interface to be implemented by each of the plurality of file sets.

13. The apparatus of claim 7 further comprises a renaming component for renaming an at least one element comprised in a code file of a file set, for providing the associating.

14. A computer readable storage medium containing a set of instructions for a general purpose computer, for performing the method of claim 1.

15. A method for implementing a control as part of a user interface for an application that is executed by a computing platform, the control using a plurality of file sets, each of the plurality of file sets comprises a user interface file and a code file, The user interface of each of the file sets describes a display of the file set; the code file of each of the file sets is specific to the file set; each of the plurality of file sets implementing an at least one task, the method comprising:

aggregating in runtime, only the user interface files from the plurality of file sets into a unified user interface file, the unified user interface file describing the display of the control on a display device; and associating an at least one event with the at least one task implemented by a code file of one file set from the plurality of file sets; wherein the event is activating the display of the one file set from the display of the control display for executing the at least one task on the computing platform.

* * * * *

UNITED STATES PATENT AND TRADEMARK OFFICE
CERTIFICATE OF CORRECTION

PATENT NO. : 8,423,895 B2
APPLICATION NO. : 11/678629
DATED : April 16, 2013
INVENTOR(S) : Gil Friedman et al.

Page 1 of 1

It is certified that error appears in the above-identified patent and that said Letters Patent is hereby corrected as shown below:

In the Claims:

Col. 9, lines 20-22, Claim 3 should be amended as follows (add omitted limitation and replace "unit" with --control--):

3. The method of claim 1 --wherein accessing the plurality of file sets is performed according to an at least one parameter, and-- wherein the at least one parameter is selected from the group consisting of; a language; and a role associated with a user of the "unit" --control--.

Col. 9, lines 27-29, Claim 5 should be amended as follows (replace "unit" with --control--):

5. The method of claim 1 wherein the user interface of the file set comprises a description of an arrangement of the plurality of file sets within the "unit" --control--.

The term "the at least one parameter" and "unit" in claim 3 and "unit" in claim 5 lack antecedent basis.

Signed and Sealed this
First Day of October, 2013

Teresa Stanek Rea
*Deputy Director of the United States Patent and Trademark Office*